United States Patent Office 2,984,519
Patented May 16, 1961

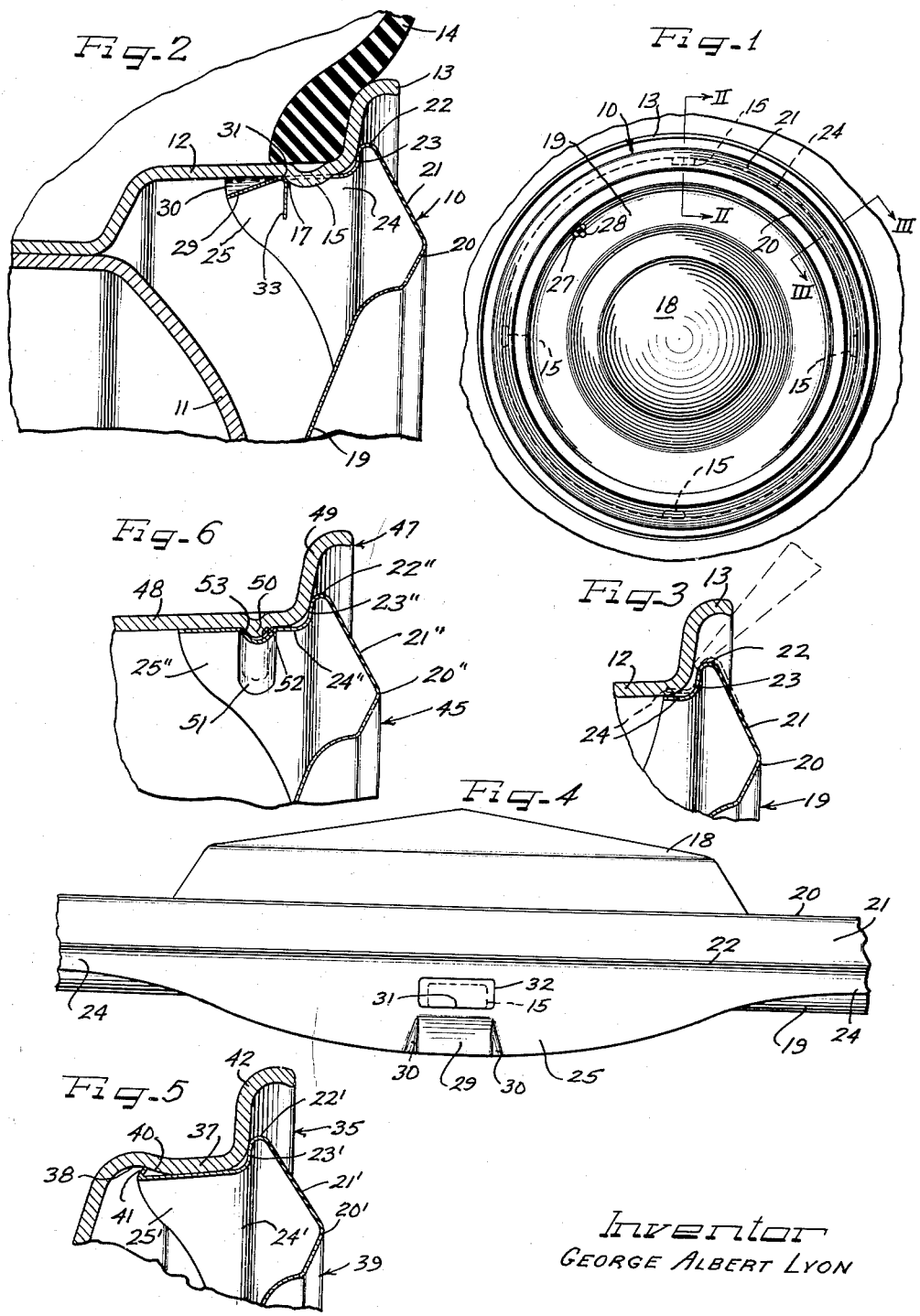

2,984,519

WHEEL COVER

George Albert Lyon, 13881 W. Chicago Blvd., Detroit, Mich.

Filed Dec. 18, 1956, Ser. No. 629,040

3 Claims. (Cl. 301—37)

The present invention relates to improvements in wheel structures and more particularly concerns the ornamental and protective covering of the outer sides of vehicle wheels.

Various expedients have from time to time been proposed for retaining sheet metal wheel covers on vehicle wheels. The most desirable of such means are such as can be provided on the wheel cover plates or disks or rings as a part of the cover structure for shelf-retaining engagement in press-on, pry-off relation with the wheel.

One of the prior expedients that has been used with some success is the provision of a flange on the wheel cover having a beaded extremity that is engageable over protrusions or bumps on the wheel. Due to the variables and manufacturing tolerances that must be allowed with respect to sheet metal members, a substantial problem has been encountered with that mode of retaining the cover on the wheel because it is difficult to maintain a proper dimensional relationship between the cover-retaining bead and the rim flange that has the retaining bumps, so that at least certain covers in any production run will go on too tight and others too loose, resulting in rejects, and if passed into the field unsatisfactory either rattly or too stiff covers, from the user's standpoint.

Furthermore, a beaded flange as discussed hereinabove requires a large amount of material in the blank from which the cover is made, and with the cost of material such as stainless steel constantly increasing, there is a corresponding need to increase wheel cover costs.

Some wheels, of course, are not provided with retaining bumps and it is therefore not practicable to utilize a beaded flange type of retaining means on the cover.

It is accordingly an important object of the present invention to provide an economical, self-retaining wheel cover of sheet metal having improved means for retaining engagement with the wheel.

A further object of the invention is to provide a wheel cover with improved retaining means for engagement with retaining bumps on a rim flange.

Another object of the invention is to provide an improved self-equalizing or compensating, uniformly flexibly and tensionably engageable cover retaining means for coacting with a tire rim flange.

Still another object of the invention is to provide improved means for retaining wheel covers in place and adapted for various types of wheel rim arrangements without requiring any major revisions in the structure or form of the retaining means.

It is still another object of the invention to provide cover retaining means which can be economically produced from material derived from corners of an angular blank of minimum dimensions insofar as the circular outline of the cover is concerned.

Other objects, features and advantages of the present invention will be readily apparent from the following detailed description of certain preferred embodiments thereof taken in conjunction with the accompanying drawings, in which:

Figure 1 is an outer side elevational view of a wheel structure embodying features of the invention;

Figure 2 is a fragmentary radial sectional detail view on an enlarged scale taken substantially on the line II—II of Figure 1;

Figure 3 is a fragmentary enlarged radial sectional detail view taken substantially on the line III—III of Figure 1;

Figure 4 is a fragmentary edge elevational view of the cover of Figures 1, 2 and 3;

Figure 5 is a fragmentary radial sectional view similar to Figure 2 but showing a slight modification; and Figure 6 is a fragmentary radial sectional view similar to Figures 2 and 5 and showing another modification.

A wheel cover 10 embodying features of the present invention is adapted to be applied to the outer side of a vehicle wheel including a wheel body 11 which supports a tire rim of the drop-center, multi-flange type including an intermediate generally radially inwardly facing axially and radially outwardly inclined flange 12 merging into a terminal flange 13 that extends radially outwardly and then is turned axially outwardly. A pneumatic tire 14 is adapted to be supported by the tire rim.

In the axially outer part thereof, adjacent to juncture with the terminal flange 13, the intermediate flange 12 has a series of circumferentially spaced, generally radially inwardly extending protrusions or cover retaining bumps 15. By preference, there are four of such retaining bumps equidistantly spaced about the rim flange 12 and each bump provided with a generally radially and axially inwardly facing retaining shoulder 17. There may, of course, be a larger or smaller number of the retaining bumps 15.

In a preferred form, the cover 10 comprises a one-piece sheet metal full disk member. That is, the cover is dimensioned for substantially entirely overlying the wheel inclusive of the wheel body 11 and the tire rim. Suitable sheet metal from which the cover 10 may be made comprise stainless steel, brass or the like, materials which are readily adapted for drawing and shaping in suitable dies for this purpose. If preferred, the cover may be a ring member with a central separable cover member or hub cap. However, the construction and arrangement of the cover 10 is such that it is readily applicable in its entirety to the wheel by pressing the same into position manually and is removable readily by simply prying the same free from the wheel as by means of a screwdriver or the like type of pry-off tool.

Centrally the circular cover 10 has a crown portion 18 about which is disposed a circular generally inwardly dished intermediate annular portion 19 leading at its radially outer side to an outer marginal annular portion 20 which in the present instance is axially outwardly ribbed and has a generally radially outwardly and axially inwardly oblique annular marginal extremity flange portion 21 which is of some resilient flexibility beyond the rib 20, but is stiffened by the rib 20 and by a turned outer extremity reinforcing and finishing small radius rib-like terminal 22.

The turned extremity 22 is of a diameter to overlie the terminal flange 13 of the tire rim adjacent to juncture thereof with the intermediate flange 12 and sufficiently radially inwardly from the outturned portion of the terminal flange 13 to accommodate wheel balancing weights.

For retaining the cover 10 on the wheel, improved cover retaining finger means formed integrally in one piece with the body of the cover are provided. To this end, an underturned narrow generally radially inwardly extending flange 23 project from the axially inner side of the turned extremity 22 and has extending generally axially inwardly therefrom and angularly related thereto a continuous narrow annular flange portion 24 which is adapted to extend around the juncture between the intermediate flange 12 and the terminal flange 13 of the tire rim.

Projecting generally axially inwardly as extensions in one piece from the flange portion 24 is a series of cover retaining fingers 25 equal in number to the retaining bumps 15 and spaced about the margin of the cover and concealed therebehind for cover retaining orientation with respect to the retaining bumps 15. These fingers are adapted to be derived from material in the corner portions of a sheet metal blank lying beyond the circular perimeter of the cover proper and are thus quite economically produced since they do not require additional material to be provided in the blank than is normally present in the blank proportioned to satisfy the dimensional requirements to have beyond the finished perimeter 22 of the cover sufficient material for the underturned flange structure 23, 24 to the extent that the axial flange 24 projects axially between the fingers 25.

Normally the retaining fingers 25 are inclined slightly radially outwardly to a greater diameter than the diameter of the intermediate flange 12 in that portion thereof to be engaged by the fingers. As best seen in Figure 4, each of the fingers is preferably of a generally ear or lobe-like shape with the sides thereof flaring widely arcuately, in more or less ogee edge curvature with the inner extremity of the axial flange 24 intermediate the fingers 25. This ties the fingers in flexure control relationship with the flange 24 entirely around the perimeter of the cover and through the flange 24 ties each of the fingers 25 mutually into a flexure unit.

In the normal, radially outwardly inclined relation of the retaining fingers 25, the central, longer portions of the fingers are of a transverse radius of curvature which is at least slightly less than the radius of curvature of the inner face of the intermediate flange 12 in the portion thereof to be engaged by the fingers, and also of a smaller radius of curvature than the radius of curvature of the cover flange portion 24, especially in the portions thereof intermediate the fingers 25. For a more complete disclosure of this relationship, reference may be had to my copending application Serial No. 629,039, filed of even date herewith.

In applying the cover 10 to the outer side of the wheel, a valve stem aperture 27 located in the intermediate cover portion 19 centrally between two of the retaining fingers 25 (Fig. 1) is registered with a valve stem 28 which is located centrally on the tire rim between two of the retaining bumps 15. In doing so, the cover is usually canted relative to the face plane of the wheel toward the valve stem 28. Thereby not only is the valve stem 28 registered through the valve stem hole 27, but at the same time the two adjacent retaining fingers 25 are located in general alignment with the adjacent two retaining bumps 15.

As the retaining fingers are brought toward alignment with the bumps 15, bump finding, lead-in inset ramps 29 running out obliquely axially and radially inwardly from the central portions of the tip extremities of the fingers 25 are engageable with the generally axially outwardly facing cam surfaces of the bumps 15. Converging side shoulders 30 at the circumferentially opposite sides of the respective ramps 29 assist in enabling registration by feel with the retaining bumps by engagement with the respective opposite sides of the bumps responsive to limited oscillation of the cover incident to intial assembly thereof with the wheel.

At their axially outer ends the ramps 29 merge into the plane of the radially outer face of the respective retaining finger 25 adjacent to a respective bump engaging generally axially outwardly facing shoulder 31 defining the axially inner side of a bump clearing socket 32 in this instance in the form of an aperture which is of an axial dimension to clear the outer or lead-in side of the associated retaining bump 15 and is of a transverse or circumferential dimension somewhat greater than the similar dimension of the retaining bump in order to afford a limited range of assembly tolerance. It will be observed that the respective opposite circumferential sides or edges defining the bump socket 32 provide shoulders that are engageable with the opposing end or circumferential side shoulders of the associated retaining bumps 15 to positively restrain the cover against turning on the wheel in response to torque stresses or forces in service. As best seen in Figure 2, the bump engaging shoulder 31 is of a reinforced, substantially finished structure by virtue of having a flange 33 of material derived from striking out of the aperture 32 bent generally radially inwardly angularly from the radially outer face of the retaining finger 25. In order to assure firm retaining gripping of the bump shoulder 17 by the retaining finger shoulder 31, the angle of juncture of the turned back stiffening flange 33 should be as sharp or angular as possible. It will be observed that in addition to the reinforcement provided by the turned in lip or reinforcement flange 33, the ramp shoulders 30 which are in the form of crimps or angular panels or flanges are also a reinforcing factor, all strongly resisting buckling distortion of the retaining finger in the area or region of the bump engaging shoulder 31.

After the initial two bump receiving sockets 32 have been generally registered with the associated two retaining bumps 15, the remainder of the cover is pressed axially inwardly and the bump receiving ramps 29 of the remaining two fingers 25 are moved into engagement with the remaining two bumps on the wheel flange 12. As this occurs, the cover fulcrums about the portion of the underturned marginal flange 23 that seats as an axial positioning stop against the terminal flange 13 of the tire rim adjacent juncture with the intermediate flange 12. At the same time, the initially engaging two retaining fingers 25 flex generally radially inwardly since they make engagement with the intermediate flange 12 adjacent to the retaining bumps 15 about which the fingers are engaged against the flange. As the remaining two retaining fingers 25 are moved axially inwardly, the retaining shoulders 31 thereof flex radially inwardly over the associated retaining bumps 15, until the finger shoulders snap behind the respective bump shoulders 17 and the underturned flange 23 of the cover margin generally in alignment with such retaining fingers snaps against the seat provided by the inner portion of the terminal flange 13.

As the fairly resiliently stiff retaining fingers 25 press into the retained engagement with the intermediate flange 12, uniformly about the inner face of the latter, and the fingers are thus resiliently deflected generally radially inwardly from their normal maximum diameter, the fingers generally flatten out from the smaller radius of curvature they normally possess to the radius of curvature of the engaged portion of the inner face of the intermediate flange. This causes the retaining fingers to hug the intermediate flange 12 over substantially their entire areas opposing the intermediate flange, with the exception, of course, of the indented or inset ramp portion 29. Moreover, due to the radially inward drawing in or deflection of the retaining fingers and the substantial stiffness thereof, there is leverage applied to the cover marginal structure including the flange portions 23 and 24, the perimeter rib 22 and the more or less flexible marginal annular portion 21 of the cover to draw the respective portions of the underturned seating or stop flange 23 in line with the retaining fingers 25 generally axially inwardly by a slight flexible resilient distortion or buckling of the cover margin.

At the same time, by way of flexure compensation or relief those portions of the cover margin intermediate the retaining fingers 25 and generally aligned with the narrowest portions of the axially extending cover flange 24, buckle or resiliently distort slightly axially outwardly. This phenomenon is readily observable, as shown in Figure 3 since in the fully seated relation of the cover over the wheel, such intermediate portions disclose a slight gap between the seating flange 23 and the adjacent portion of the tire rim. This is advantageous in facilitating insertion of a pry-off tool such as a screwdriver behind the edge of the cover for prying the cover free from the wheel.

It has also been observed that during application of the cover to the wheel, radially inward deflection of the retaining fingers beyond the tire rim flange abutting relationship thereof, as when the retaining shoulder portions 31 of the fingers are pressed in over and past the retaining bumps 15, such yielding is enabled by compensating radially outward resiliently yielding deflection of those portions of the axially inwardly extending flange 24 between the fingers 25. In fact, such radially outward compensatory yielding may be to a diameter substantially greater than the diameter of the axially outermost portion of the intermediate flange 12, as shown in dash outline in Fig. 3. Of course, after the respective retaining shoulders 31 of the retaining fingers cam behind the bump shoulders 17, so that the retaining fingers relax and flex back radially outwardly, there is a corresponding relation of the axial flange 24 between the fingers toward normal diameter.

By preference, in the fully attached condition of the cover, wherein all of the retaining fingers 25 are drawn axially inwardly to the maximum by engagement of the retaining shoulders 31 thereof behind the bump shoulders 17 and by engagement of the aligned portions of the underturned flange 23 with the tire rim, not only the at least axially innermost portions of the retaining fingers 25 but also the side portions thereof and the axially inner terminal portion of the axial flange 24 between the fingers engage with reasonably uniform snugness under resilient tension against the intermediate flange 12. As a result, the cover is thoroughly cushioned against transverse road shocks and the like and against any possibility of rattling. Due to the resilient flexibility of the cover margin inclusive of the retaining flange structure, the cover is enabled to yield generally conformably to weaving movements of the tire rim so as to avoid any strain or tendency of the cover to dislodge from the wheel.

Where a tire rim 35 (Fig. 5) is used on a wheel and provided with what is commonly known as a safety groove which provides in an intermediate flange 37 of the tire rim a generally radially inwardly opening annular groove 38 in the axially inner portion of the intermediate flange, a slightly modified arrangement of the retaining finger means in a wheel cover 39 may be provided for utilizing a shoulder 40 at the axially outer side of said groove for latching or interlocking the cover against unintentional axially outward dislodgment. The cover 39 may in general respects be identical with the cover 10 and to show the similarity of substantially identical parts, primed reference numerals of the same series as identifying the parts of the cover 10 are used and it should be understood that the coaction or cooperation of functioning of such parts is identical with the similar parts in the cover 10 unless otherwise described.

The cover 39 differs from the cover 10 in that the retaining fingers 25', instead of being equipped with bump receiving sockets, are adapted to anchor in the rim groove 38. For this purpose, the axially inner or terminal end portions of the fingers 25' are turned to provide generally radially outwardly extending terminals 41 which are engageable generally interlockingly behind the groove shoulder 40. The terminals 41 are of a short stiff nature so that upon prying the cover free from the wheel, they will slide out of engagement with the rim shoulder 40. In this instance the terminals 41 are oblique generally radially and axially outwardly extending turned terminal flange portions. The construction and relationship is such that the terminals 41 cam axially inwardly on the rim shoulder 40 and thereby draw the underturned seating and stop flange 23' of the cover snugly against the inner portion of a terminal flange 42 on the tire rim and more particularly that portion of such flange which is adjacent juncture of the same with the intermediate flange 37.

In another modification as shown in Figure 6, a wheel cover 45 is applied to the outer side of a tire rim 47 which includes an intermediate radially inwardly facing flange 48 joining a generally radially and axially outwardly extending terminal flange 49, and the intermediate flange is provided with a shallow circumferentially extending radially inwardly projecting rib 50 of limited length and substantially shallower depth than the retaining bumps 15 of the wheel shown in Figures 1 and 2.

In the form of Figure 6, the cover 45 is substantially the same as the cover 10 and therefore double primed reference numerals of the same series indicate similar parts of the cover 45 which it will be understood are structurally and functionally substantially the same. In this instance, the retaining fingers 25'' are provided with transverse, that is circumferentially running rib-like embossments 51 providing radially outwardly opening respective grooves 52 receptive of the respective ribs 50 and dimensioned in general to clear the respective rib 50 but having at the axially inner sides of the grooves 52 generally radially and axially outwardly facing respective shoulders 53 which are engageable behind the axially inwardly facing shoulders of the ribs 50 for generally cover retaining interlocking engagement. Since the shoulders 53 and the ribs 50 are of substantially greater length than the width of the retaining bumps 15, it will be appreciated that the frictional interlocking engagement afforded by the rib and groove shoulder relationship compensates for any lackin depth of the rib provided shoulder as compared to the retaining bump provided shoulders 17. It will be observed that the respective opposite ends of the retaining ribs 50 extend short of the respective opposite ends of the emboss ribs 51 defining the groove 52 which thus serve as turn-preventing stops engageable with the ends of the shoulder rib 50 in each instance.

It will be understood that modifications and variations may be effected without departing from the scope of the novel concepts of the present invention.

I claim as my invention:

1. In a wheel structure including a tire rim having a generally radially inwardly facing annular flange, a cover for disposition at the outer side of the wheel including a circular cover member having a continuous annular marginal generally axially inwardly extending flange provided with a plurality of generally axially inwardly projecting finger extensions of substantial length merging at their sides into substantially narrower portions of the axial flange between the fingers, the fingers being engageable under radially inward flexure tension against the rim flange and resiliently reacting in the portions of the axial flange between the fingers to resiliently deflect such portions generally radially outwardly into engagement with the rim flange so that entirely about the axially extending flange there is substantially uniform gripping engagement not only by the fingers but also by the flange portions between the fingers with said rim flange, said fingers having circumferentially elongated narrow ribs defining radially outwardly opening grooves shorter than the width of the fingers and receptive of interlock ribs extending circumferentially on the rim flange slightly shorter than the grooves and projecting radially inwardly, the ends of the interlock ribs opposing the ends defining said grooves and thereby retaining the cover against turning.

2. In a cover for disposition over the outer side of a vehicle wheel, a circular cover member having an axially inner side and an axially outer side and including a margin having extending generally axially inwardly at the axially inner side resilient sheet metal retaining fingers of substantial circumferential extent and constructed and arranged to engage retainingly with retaining bumps projecting from a generally radially facing opposing annular flange portion of a wheel, said fingers having bump receiving sockets spaced axially outwardly from the axially inner edges of the fingers and defined at the axially inner sides of the sockets with bump engaging shoulders, at least certain of said fingers having inset from the plane thereof and aligned with the socket shoulder and extending obliquely from the socket shoulder to the axially inner edge of the finger a guide ramp to facilitate leading in of a retaining bump into the socket, said guide ramp being defined at its opposite sides by converging side shoulder angular panel flanges reinforcing the finger to resist buckling distortion in the region of the bump engaging shoulder of the socket and also enabling registration by feel with a retaining bump by engagement with the respective opposite sides of the bump responsive to limited oscillation of the cover incident to initial assembly thereof with a wheel.

3. In a cover for disposition over the outer side of a vehicle wheel, a circular cover member having an axially inner side and an axially outer side and including a margin having extending generally axially inwardly at the axially inner side resilient sheet metal retaining fingers of substantial circumferential extent and constructed and arranged to engage retainingly with retaining bumps projecting from a generally radially facing opposing annular flange portion of a wheel, said fingers having bump receiving sockets spaced axially outwardly from the axially inner edges of the fingers and defined at the axially inner sides of the sockets with bump engaging shoulders, at least certain of said fingers having inset from the plane thereof and aligned with the socket shoulder and extending obliquely from the socket shoulder to the axially inner edge of the finger a guide ramp to facilitate leading in of a retaining bump into the socket, said guide ramp being defined at its opposite sides by converging side shoulder angular panel flanges reinforcing the finger to resist buckling distortion in the region of the bump engaging shoulder of the socket and also enabling registration by feel with a retaining bump by engagement with the respective opposite sides of the bump responsive to limited oscillation of the cover incident to initial assembly thereof with a wheel, said socket shoulder having a reinforcing flange thereon extending between the adjacent ends of said ramp side panel flanges and coacting therewith to reinforce the shoulder region of the finger.

References Cited in the file of this patent

UNITED STATES PATENTS

| 2,308,617 | Lyon | Jan. 19, 1943 |
| 2,308,618 | Lyon | Jan. 19, 1943 |
| 2,624,627 | Lyon | Jan. 6, 1953 |
| 2,624,628 | Lyon | Jan. 6, 1953 |
| 2,624,634 | Lyon | Jan. 6, 1953 |
| 2,624,640 | Lyon | Jan. 6, 1953 |
| 2,640,730 | Lyon | June 2, 1953 |
| 2,675,040 | Raun et al. | Apr. 13, 1954 |

FOREIGN PATENTS

| 744,837 | Great Britain | Feb. 15, 1956 |